United States Patent [19]

Brewster

[11] Patent Number: 4,806,296

[45] Date of Patent: Feb. 21, 1989

[54] PROCESS OF MODIFYING POLYMERS TO PRODUCE A MORE READILY PAINTABLE SURFACE

[75] Inventor: Steven L. Brewster, Lake Jackson, Tex.

[73] Assignee: The Dow Chemical Company, Midland, Mich.

[21] Appl. No.: 87,017

[22] Filed: Aug. 19, 1987

[51] Int. Cl.$^4$ .................. B29C 71/00; C08F 8/30
[52] U.S. Cl. ..................... 264/83; 264/237; 264/320; 264/323; 264/328.16; 264/331.17; 264/331.18; 264/337; 264/338; 525/192; 525/330.5; 525/374; 525/377
[58] Field of Search ............... 264/83, 237, 320, 323, 264/328.16, 328.17, 331.17, 331.18, 338, 348, 337, 78; 525/192, 330.5, 374, 377; 526/236, 328, 352, 352.2; 528/490

[56] References Cited

U.S. PATENT DOCUMENTS

| | | |
|---|---|---|
| 2,715,077 | 8/1955 | Wolinski .................. 264/83 X |
| 2,878,519 | 3/1959 | Wolinski .................. 264/237 X |
| 3,305,297 | 2/1967 | Mantell et al. . |
| 3,322,870 | 5/1967 | Sacks .................. 264/514 X |
| 3,505,297 | 4/1970 | Sheetz et al. .................. 525/377 X |
| 3,583,962 | 6/1971 | Magay .................. 525/377 X |
| 3,761,299 | 9/1973 | Lidel .................. 427/47 |
| 3,879,358 | 4/1975 | Lachowicz et al. .................. 525/376 |
| 3,880,822 | 4/1975 | Perrotti et al. .................. 525/377 X |
| 4,072,769 | 2/1978 | Lidel .................. 427/38 |

FOREIGN PATENT DOCUMENTS

| | | | |
|---|---|---|---|
| 1093556 | 11/1960 | Fed. Rep. of Germany ...... 525/377 |
| 2501103 | 9/1982 | France .................. 264/338 |
| 59-103714 | 6/1984 | Japan .................. 264/338 |
| 60-174616 | 9/1985 | Japan .................. 264/338 |
| 891758 | 3/1962 | United Kingdom .................. 525/377 |

Primary Examiner—Jeffery Thurlow
Assistant Examiner—Leo B. Tentoni
Attorney, Agent, or Firm—A. Cooper Ancona

[57] ABSTRACT

Polymeric articles made of, for example, polyethylene and copolymers of ethylene, are made more adherent to paint or dyes by first nitrating the polymer, then shaping or forming it in a mould having a polar surface and finally, cooling it in contact with that surface, or extruding a nitrated polymer onto a polar surface and allowing to cool in contact with that surface.

30 Claims, No Drawings

PROCESS OF MODIFYING POLYMERS TO PRODUCE A MORE READILY PAINTABLE SURFACE

BACKGROUND OF THE INVENTION

Numerous attempts have been made to modify polymers in order to make their surfaces more acceptable to dyeing or painting. Most of the known modifications have been made on the polymer after it has been fabricated, i.e. made into sheets, fibers or other articles of manufacture. One of the methods employed to modify the surface has been a nitration of that surface. Thus, for example, U.S. Pat. No. 3,305,297 teaches the nitration of fabrics with nitrogen dioxide to increase the uptake of basic dyes. Another patent, U.S. Pat. No. 3,583,962, teaches a method of cross-linking by reacting a nitrated polyethylene with diacyl halides or alkali hydroxides. The nitration had been accomplished by reacting polyethylene with nitrogen dioxide. Nitration has also been accomplished by employing radio frequency electromagnetic radiation as an activator of nitrogen dioxide in U.S. Pat. No. 3,761,299. This same teaching also is found in U.S. Pat. No. 4,072,769.

In yet another reference, U.S. Pat. No. 3,879,358, nitrogen tetroxide is reacted with an unsaturated polymer to produce a saturated chain containing nitro groups to which acrylic monomers are then grafted.

According to presently known technology polymers are made more adherent to paint by nitrating the surface of articles fabricated from such polymers. Thus, any apparatus designed to nitrate such surfaces must accommodate a variety of shapes and sizes, or a different apparatus must be designed for each kind of article. It would be desirable if the nitration of the polymer could be accomplished prior to fabrication so that an article fabricated from such nitrated polymer would then readily accept paint.

The present inventor has discovered that when a polymer which has been nitrated is fabricated in a particular manner, i.e. cooled in contact with a polar surface, articles of manufacture which accept paints or dyes more readily are produced.

SUMMARY OF THE INVENTION

Articles manufactured from moldable or extrudable polymers more readily accept dyes and paints when the polymer is first nitrated, subsequently formed into an article at an elevated temperature and then cooled while the surface of the article is in contact with a polar substrate. For example, polyethylene is nitrated, formed into an article and cooled in contact with a polar surface, e.g. a polyester or polyimide surface.

DETAILED DESCRIPTION OF THE INVENTION

Various polymers, especially those which are difficult to paint or which do not accept dyes and inks readily, can be employed in the process of the present invention. Thus high and low density polyethylenes, linear low density polyethylene, polypropylene, ethylene-acrylic acid copolymers, polyamides, polycarbonates, polystyrene, polyurethanes, polysulfones, polyvinyl chloride, polyvinylidene chloride, epoxy resins and the like can be nitrated and subsequently, at elevated temperatures sufficient for extrusion or molding, formed into sheets, films or other fabricated items and finally cooled while in contact with a polar substrate.

The polymers to be nitrated can be in any convenient form, but preferably in the form of spherical particles or a powder. The nitration can be accomplished by contacting the polymer with nitrogen dioxide under pressure and at an elevated temperature with stirring in a corrosion-resistant reactor.

Temperatures employed in the nitration of the polymers are those known to the art. Thus, for example temperatures of from about 25° to about 140° C., preferably from about 60° about 100° C. are useful.

Pressures employed are those known to the art and are usually autogenous, atmospheric pressure being most frequently employed.

Once the nitration has been accomplished, the polymers are molded or extruded into any desired form, but the surface against which the polymer is molded, i.e. the interior of the mold, or the surface against which the extruded material is allowed to cool must be of a polar nature. Thus, injection molding using a mold having a polar surface is contemplated.

Polar materials useful as substrates in the process of the invention are, for example polyesters such as polyethylene terphthalate and polyimides such as those produced under the trademark Kapton by the E. I. Dupont Company.

The following examples are representative of the invention:

NITRATION OF POLYMER

A quantity of powdered high density polyethylene (300 g) was placed in a cylindrical reactor (12"×3" I.D., 30.5 cm.×7.6 cm.) wrapped with heating tape. The reactor was heated to a temperature of about 100° C. and rotated at 15 rpm. to insure uniform heating and mixing of the contents of the reactor. The reactor is evacuated and purged several times with nitrogen after which nitrogen dioxide is introduced through a sparge tube though one end of the cylindrical reactor at the rate of 50 cc./min. diluted with an equal volume of helium. The reaction is continued for a period of six hours. The reactor is then cooled to room temperature and the nitrated polymer removed and washed with hot water to remove any unreacted residual nitrogen dioxide or acidic by-products.

EXAMPLE 1.

The nitrated polymer prepared as above was then dried and compression molded at 350° F. (177° C/), at 10,000 psi (680 atoms.) for 20 to 90 sec., the surfaces of the mold platens being covered with a film of polyethylene terphthalate*. The molded plaque or disc was allowed to cool and then removed from the mold. For comparison a sample of the same high density polyethylene, which was not nitrated, was compression molded under the same conditions. Thereafter each of the plaques was sprayed with the same commercial paint, dried overnight at 60° C. and then scored with a razor blade and tape placed on the surface of the paint (in accordance with ASTM D3359-83 test procedure) to determine how much of the paint film was removed when the tape was pulled from the surface.

*The particular film used was a product sold under the tradename Mylar, a product of E. I. Dupont Company.

It was observed that much more of the paint adhered to the surface of the nitrated polymer of the invention than adhered to the polymer which was not nitrated, although both were formed in the same way, i.e. formed and cooled against a polar surface.

PAINT REMOVAL TEST.

The paint adherence was evaluated scoring the surface of the dried painted surface of a molded plaque or disc with a multibladed knife which produced a number of parallel cuts. The cuts were made in two directions at an angle of 90° to one another, forming a series of squares. Tape was applied firmly to the scored surface and then removed by rapidly pulling from the surface. The number of squares of paint remaining on the surface of the article was then counted and a percent adhesion calculated. A 100 percent adhesion means that no paint was removed while 0 percent indicates that all of the paint was adhering to the tape and that none was left on the surface.

EXAMPLE 2.

A disc of molded polymer was formed by placing a stainless steel plate 40 mils thick, containing a hole 1.5" (3.8 cm.) in circumference, on a sheet of polyethylene terphthlalate (PET) which, in turn, rested on a steel tray. The hole was filled with powdered polymer and a second sheet of PET was placed over it and covered with a solid stainless steel plate. The entire assembly was then placed in hydraulic press and heated to a temperature of 150° C. at a pressure of 20,000 psig for 45 seconds. After cooling, the disc was removed from the mold and painted.

A number of different polymers were formed into discs and subsequently painted, dried and tested in the manner described above. The type of polymer and paint employed together with the results of the adhesion test are shown in Table I. Samples 1-4 are comparative while Samples 5-8 are representative of the invention.

TABLE I

| Sample No. | Polymer* | Paint# | % Adhesion |
|---|---|---|---|
| 1 | HDPE | SPARVAR | 0 |
| 2 | HDPE | PPG 9469 | 0 |
| 3 | DOWLEX 905 | SPARVAR | 0 |
| 4 | DOWLEX 905 | PPG 9469 | 0 |
| 5 | HDPE (nitrated) | SPARVAR | 90 |
| 6 | HDPE (nitrated) | PPG 9469 | 100 |
| 7 | DOWLEX (nitrated) | SPARVAR | 95 |
| 8 | DOWLEX (nitrated) | PPG 9469 | 100 |

*Polymers used were: HDPE, a high density polyethylene having a Mw of ~180,000 with a 0.3 melt index; and DOWLEX ® 905, a trademark of The Dow Chemical Company for a polymer which is a blend of low density polyethylenes with 3% ethyl vinyl acetate.
Paints used were: SPARVAR - an acrylic based topcoat made of an acrylic-vinyl toluene-safflower alkyd resin, made by Borden, Inc.; PPG 9469 is a urethane based primer paint employed in the auto industry, made by Pittsburgh Plate Glass Co.

EXAMPLE 3.

Experiments were conducted to compare the adhesion of paints to nitrated polymers (1) molded against a surface of a non-polar material, and (2) molded against a polar surface. Two different paints, the same as those of Example 2 above, were used. The polymer used was a nitrated HDPE. Results are shown in Table II. Samples 9 and 10 are of the invention while Samples 11 and 12 are comparative.

TABLE II

| Sample No. | Paint | Surface | % Adhesion |
|---|---|---|---|
| 9 | SPARVAR | Mylar | 75 |
| 10 | PPG 9469 | Mylar | 100 |
| 11 | SPARVAR | Teflon | 0 |
| 12 | PPG 9469 | Teflon | 30 |

It can be seen from the above data that the non-polar surface of Teflon (Samples 11 & 12) provides little or no adhesion whereas the polar surface of Mylar (Samples 9 & 10) gives much improved adhesion.

It is hypothesized that the polar nitro groups in the polymer are perhaps oriented in or drawn to the surface of the fabricated polymer which is in contact with the polar material, thus making the polymer surface more adherent to the paint. This apparently does not happen, or happens to a much lesser extent, when the polymer is molded against a non-polar surface.

I claim:

1. A process of producing an article of a polymer which has a more readily paintable surface which comprises the steps of (a) nitrating the polymer, (b) heating and forming the polymer into an article, (c) cooling the article while the surface of said article is in contact with a polar material.

2. The process of claim 1 wherein the polymer of step (a) is a polyethylene.

3. The process of claim 2 wherein the polyethylene is a low density material.

4. The process of claim 3 wherein the polymer contains a minor amount of a comonomer.

5. The process of claim 4 wherein the comonomer is vinyl acetate.

6. The process of claim 2 wherein the polyethylene is a high density material.

7. The process of claim 6 wherein the high density material has a Mw of more than 100,000.

8. The process of claim 2 wherein the polar material is a polyester.

9. The process of claim 8 wherein the polyester is polyethylene terphthalate.

10. The process of claim 2 wherein the polar material is a polyimide.

11. A process of producing a more readily paintable surface of a polymer article which comprises the steps of (a) nitrating a polymer, (b) heating and forming said nitrated polymer against a polar surface and (c) cooling prior to removing from said polar surface.

12. The process of claim 11 wherein the nitrated polymer is a nitrated polyethylene.

13. The process of claim 12 wherein the nitrated polyethylene is a high density material.

14. The process of claim 13 wherein the high density material has a Mw of more than 100,000.

15. The process of claim 11 wherein the polar surface is a polyester.

16. The process of claim 15 wherein the polyester is polyethylene terphthalate.

17. The process of claim 11 wherein the nitrated polyethylene is a low density material.

18. The process of claim 17 wherein the polymer contains a minor amount of a comonomer.

19. The process of claim 18 wherein the comonomer is vinyl acetate.

20. The process of claim 14 wherein the polar surface is a polyester.

21. The process of claim 20 wherein the polyester is polyethylene terphthalate.

22. A process of producing a more readily paintable surface of a polymer article which comprises the steps of heating and extruding a nitrated polymer onto a material having a polar surface and allowing the extruded polymer to cool in contact with said surface and subsequently forming an article from said polymer.

23. The process of claim 22 wherein the nitrated polymer is a polyethylene.

24. The process of claim 23 wherein the polyethylene is a low density material.

25. The process of claim 24 wherein the polymer contains a minor amount of a comonomer.

26. The process of claim 25 wherein the comonomer is vinyl acetate.

27. The process of claim 22 wherein the polyethylene is a high density material.

28. The process of claim 27 wherein the high density material has a Mw of more than 100,000.

29. The process of claim 22 wherein the polar surface is a polyester.

30. The process of claim 29 wherein the polyester is polyethylene terphthalate.

* * * * *